(12) United States Patent
Burnsed et al.

(10) Patent No.: US 11,625,912 B1
(45) Date of Patent: Apr. 11, 2023

(54) FLASH AND STREAK DETECTION AND PERSISTENT IDENTIFICATION USING BI-DIRECTIONAL DETECTOR/DISPLAY OVERLAY

(71) Applicant: L3Harris Technologies, Inc., Melbourne, FL (US)

(72) Inventors: Jon D. Burnsed, Tempe, AZ (US); Jacob J. Becker, Gilbert, AZ (US); Eric Ramsey, Londonderry, NH (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 0 days.

(21) Appl. No.: 17/507,908

(22) Filed: Oct. 22, 2021

(51) Int. Cl.
  *G06V 20/10* (2022.01)
  *G02B 27/01* (2006.01)
  *H04N 5/232* (2006.01)
  *F41G 3/14* (2006.01)

(52) U.S. Cl.
  CPC ............ *G06V 20/10* (2022.01); *F41G 3/142* (2013.01); *G02B 27/0101* (2013.01); *H04N 5/23229* (2013.01); *G02B 2027/014* (2013.01); *G02B 2027/0138* (2013.01)

(58) Field of Classification Search
  None
  See application file for complete search history.

(56) References Cited

U.S. PATENT DOCUMENTS

| 9,097,891 | B2 | 8/2015 | Border et al. |
| 2013/0342474 | A1 | 12/2013 | Sultenfuss et al. |
| 2021/0400944 | A1 | 12/2021 | Burnsed et al. |

FOREIGN PATENT DOCUMENTS

| WO | 2004/002143 | 12/2003 |
| WO | 2007/049213 | 5/2007 |

OTHER PUBLICATIONS

U.S. Appl. No. 16/868,306, filed May 6, 2020.

*Primary Examiner* — Shadan E Haghani
(74) *Attorney, Agent, or Firm* — Workman Nydegger

(57) ABSTRACT

An optical system has an underlying device configured to provide output light. A transparent optical device optically coupled to the underlying device transmits light from the underlying device through the transparent optical device to display a scene. The transparent optical device includes detector elements formed in an active area to detect light portraying at least a portion of the scene. The underlying device has transparent regions formed in the active area to allow light to pass through from the underlying device to a user. The optical system further includes an image processor that processes images produced using light detected by the detector elements to identify a specific instance of light in the scene. The image processor causes display elements in the active area of the transparent optical device to display an indicator, in the scene, correlated to the specific instance of light.

20 Claims, 8 Drawing Sheets

FLASH AND STREAK DETECTION AND PERSISTENT IDENTIFICATION USING BI-DIRECTIONAL DETECTOR/DISPLAY OVERLAY

BACKGROUND

Background and Relevant Art

Dismounted soldiers on patrols in war zones are often engaged in guerilla type conflicts and will be fired on from under some cover and often from inhabited areas where innocent civilians are used as shields. The warfighters will take fire but cannot always see exactly where the fire is coming from. Even if they know the direction of fire, they may not be able to return fire safely unless they can positively recall and identify exactly where the fire was emitting from. For example, consider a case where fire is coming from an inhabited building with many windows. The warfighter may know the fire is coming from that building, but cannot properly return fire unless they know which window it is from.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment includes an optical system having an underlying device. The underlying device is configured to provide output light in a first spectrum from input light received at the underlying device. A transparent optical device is optically coupled in an overlapping fashion to the underlying device. The transparent optical device is configured to transmit light in the first spectrum from the underlying device through the transparent optical device to display a scene to a user. The transparent optical device includes a first plurality of active elements formed in an active area of the transparent optical device configured to cause the transparent optical device to detect light portraying at least a portion of the scene. The underlying device further comprises a first plurality of transparent regions formed in the active area which are transparent to the light in the first spectrum to allow light in the first spectrum to pass through from the underlying device to a user. The optical system further includes an image processor configured to process images produced using light detected by the first plurality of active elements to identify a specific instance of light in the scene. The image processor causes a second plurality of active elements in the active area of the transparent optical device to display an indicator, in the scene, to the user, correlated to the specific instance of light, including during a change in the scene.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

One embodiment illustrated herein is directed to an optical system that detects a specific instance of light (such as gunfire) and is able to persist an indicator for the specific instance of light in a scene displayed to a user, even as the scene changes. The optical system includes an underlying device, such as a nightvision system or even a daytime camera system. The underlying device is configured to provide output light in a first spectrum from input light received at the underlying device. Thus, for example, in the nightvision system example, intensified light, in the visible spectrum, is output as a result of receiving weak input light.

The optical system further includes a transparent optical device optically coupled in an overlapping fashion to the underlying device. In particular, the transparent optical device overlaps such that the transparent optical device is configured to transmit light in the first spectrum from the underlying device through the transparent optical device to display the scene to the user. The transparent optical device includes a first set of detector active elements, formed in an active area of the transparent optical device, configured to cause the transparent optical device to detect light portraying at least a portion of the scene. Note that detector elements will also detect the specific instance of light (e.g., the gunfire).

The transparent optical device further includes a set of transparent regions formed in the active area which are at least partially transparent to the light in the first spectrum to allow light in the first spectrum to pass through from the underlying device to a user. The set of transparent regions are configured in size and shape to cause the transparent optical device to have a particular transmission efficiency for light in the first spectrum.

The optical system includes an image processor configured to process images produced using light detected by the set of active elements to identify the specific instance of light in the scene. The transparent optical device also includes a set of display active elements configured to generate and output light to the user. The image processor is configured to cause display active elements in the transparent optical device to display an indicator, in the scene, to the user. The indicator is correlated to the specific instance of light. This correlation is maintained, even when there is a change in the scene. That is, the indicator will indicate with respect to a current state of the scene where the specific instance of light was detected. Examples are illustrated below.

The following illustrates examples illustrated with respect to a nightvision system. However, it should be appreciated that other optical systems can be used alternatively, or additionally.

Figure 1:
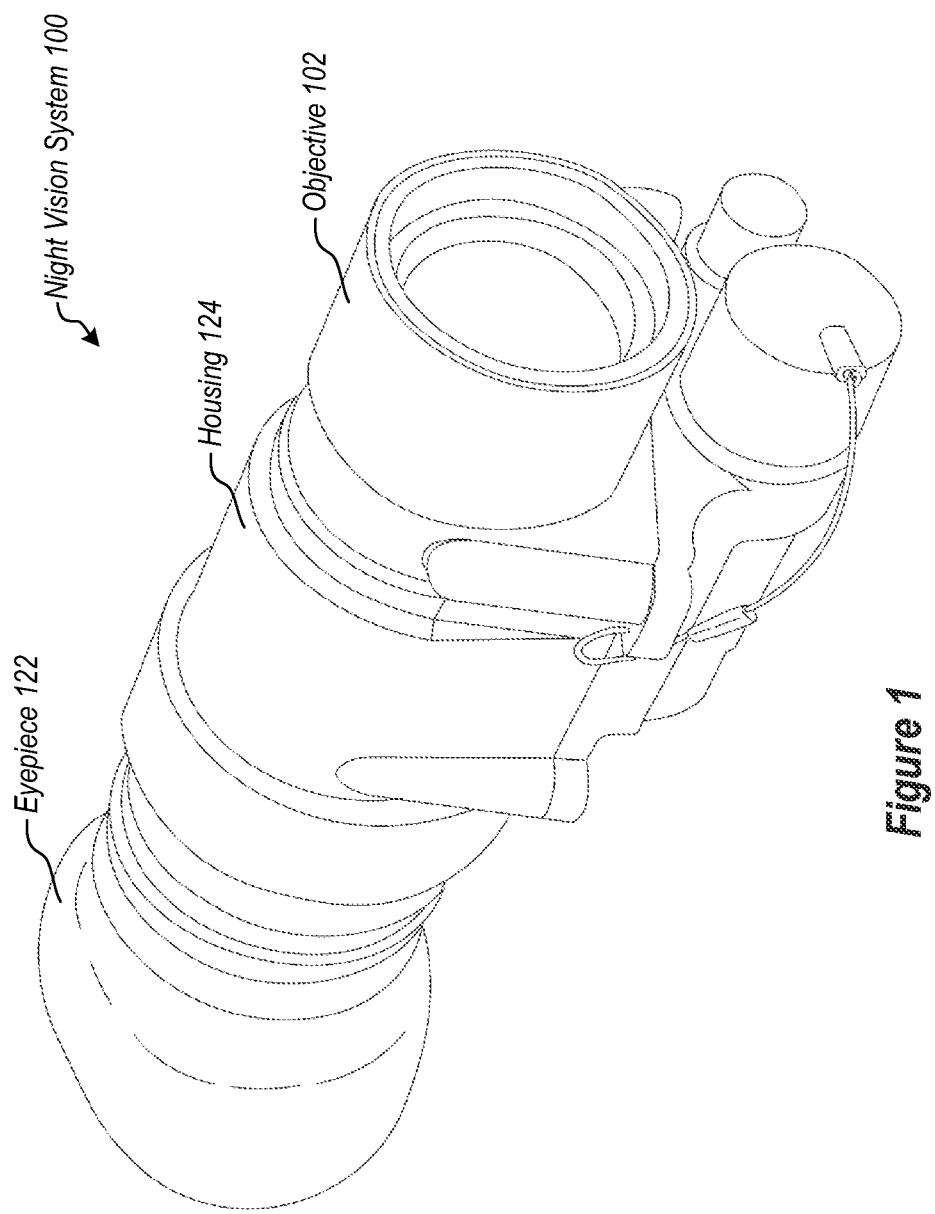
FIG. 1 illustrates a nightvision system.

Attention is now directed to FIG. 1, where a specific example of a nightvision system is illustrated. In particular, FIG. 1 illustrates the PVS-14 nightvision system 100. In the example illustrated, the nightvision system 100 includes a housing 124. As will be illustrated in more detail below in other figures, the housing 124 houses a transparent optical device having multiple detectors for detecting intensified light from the image intensifier and multiple light emitters for displaying information to a user, and various other components. The nightvision system 100 further includes an objective 102 which receives weak light reflected and/or generated in an environment. The objective 102 includes optics such as lenses, waveguides, and/or other optical components for receiving and transmitting light to an image intensifier, discussed in more detail below. The nightvision system 100 further includes an eyepiece 122. The eyepiece 122 includes optics for focusing images created by the nightvision system 100, including images created by an image intensifier and images created by a transparent optical device, into the eye of the user.

Figure 2:
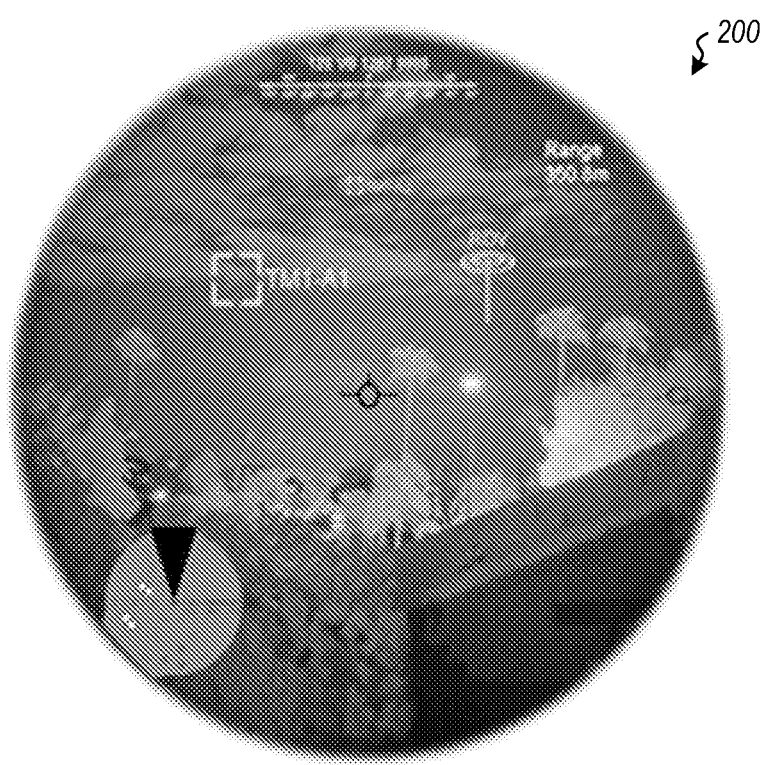
FIG. 2 illustrates a nightvision scene image with heads-up display functionality.

As discussed above, and with reference to FIG. 2, modern ancillary functionality can be added to existing nightvision systems. FIG. 2 illustrates an image 200 including a heads-up display displayed on a nightvision image output from an image intensifier. Some embodiments described herein are directed to implementing a heads-up display implemented by adding image overlay capabilities with a nightvision system, where the image overlay capabilities are able to overlay additional images over the ordinarily monochrome night vision image. In particular, embodiments further include as part of the transparent optical device, a transparent display configured to output images over the image intensifier image based on additional information about objects in the image intensifier image.

The heads-up display may display to the user, in or around the field-of-view of an environment, various pieces of information to create an augmented reality (AR) environment. Such information may include, for example, a navigational heading, the speed at which the user is moving, coordinates, communication messages (such as email, SMS, etc.), time of day or other timing information, vital signs for the user such as heart rate or respiration rate, indicators indicating whether an object being viewed by the nightvision system is friendly or adversarial, battery charge level for the nightvision system or other devices, weather conditions, contact information, audio information (such as volume, playlist information, artist, etc.), etc. Of particular note in this disclosure, is the ability of the heads-up display to persist an indicator for a specific instance of light detected in a scene.

Note that the transparent optical device (or other elements) may include one or more photodetectors for detecting intensified light. Detecting intensified light can be used to determine the locations of various objects in the field of view. A photodetector can also detect a specific instance of light (e.g., a gunshot) in the field of view of the scene. Information about device orientation, objects and the specific instance of light can be used to correlate indicators for specific instances of light to specific objects in the scene.

Figure 3:
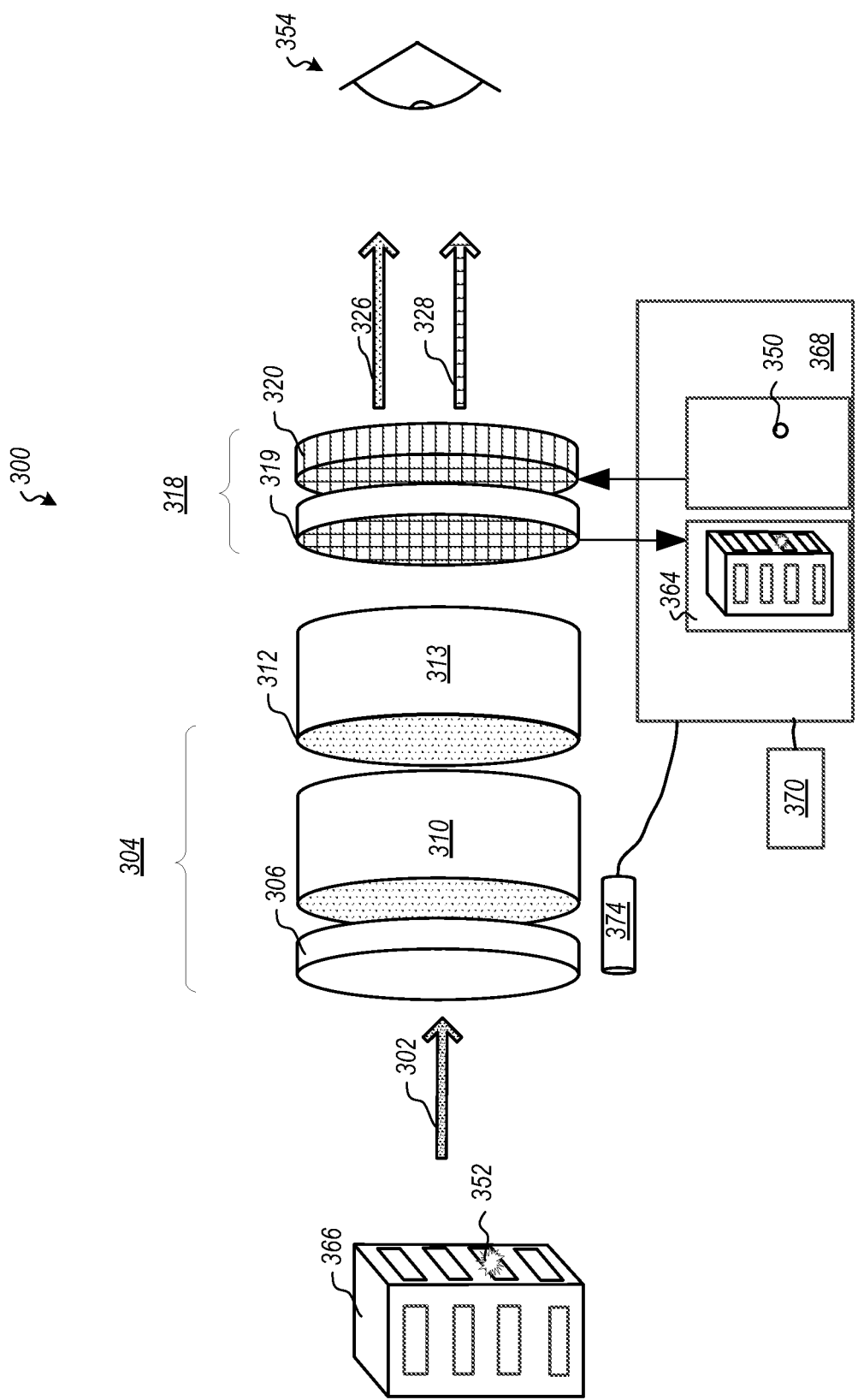
FIG. 3 illustrates a block diagram of components of a nightvision system.

Attention is now directed to FIG. 3. FIG. 3 illustrates a block diagram version of an optical system 300. While not shown in FIG. 3, a nightvision system typically includes an objective (such as that shown in FIG. 1 at 102) to focus input light 302 into an underlying device 304, which in this case is an image intensifier. Such input light may be, for example, from ambient sources, such as light from heavenly bodies such as stars, the moon, or even faint light from the setting sun. Additionally, or alternatively, ambient sources could include light from buildings, automobiles, or other faint sources of light that cause reflection of light from an object being viewed in a nightvision environment into the objective. A second source of light may be light being emitted from an external source towards an object, reflected off the object, and into the objective. For example, the source may be an infrared source that is not detectable in the visual spectrum for human observers. A third source of light may be light emitted by an object itself. For example, this may be related to infrared heat energy emitted by the object and directed into the objective. Nonetheless, the nightvision system is able to convert the light emitted from the source into a viewable image for the user.

The objective directs input light 302 into an underlying device 304. Note that the underlying device 304 may include functionality for amplifying light received from the fiber optic faceplate to create a sufficiently strong image that can be viewed by the user. This may be accomplished using various technologies such as a photocathode 306, a microchannel plate 310, and a phosphor screen 312. The photocathode 306 may be configured to generate photo electrons in response to incoming photons. Electrons from the photocathode 306 are emitted into the microchannel plate 310. Electrons are multiplied in the microchannel plate 310. Electrons are emitted from the microchannel plate 310 to a phosphor screen 312 which glows as a result of electrons striking the phosphor screen 312. This creates an image from the filtered light based on the input light 302.

A fiber-optic 313 carries this image as intensified light to the eyepiece (such as eyepiece 122 illustrated in FIG. 1) of a nightvision system where it can be output to the user. This fiber-optic can be twisted 180 degrees to undo the inversion caused by the system objective to allow for convenient direct viewing of the screen. However, as illustrated below, the intensified light is output to the user through a transparent optical device 318. The transparent optical device 318 allows intensified light to pass through the transparent optical device 318, but also generates its own light, from a transparent display 320 which includes LEDs or other light emitters, to transmit light to a user. Creating a transparent optical device may be accomplished, for example, using the teachings of U.S. patent application Ser. No. 16/868,306, filed on May 6, 2020, titled "Backside Etch Process For Transparent Silicon Oxide Technology", which is incorporated herein by reference, in its entirety.

As discussed above, the transparent optical device 318 may include functionality for displaying information to a user. Such information may include graphical content, including text, images, and the like. Further, such information may include an indicator 350 correlated to a specific instance of light 352.

Figure 5A:
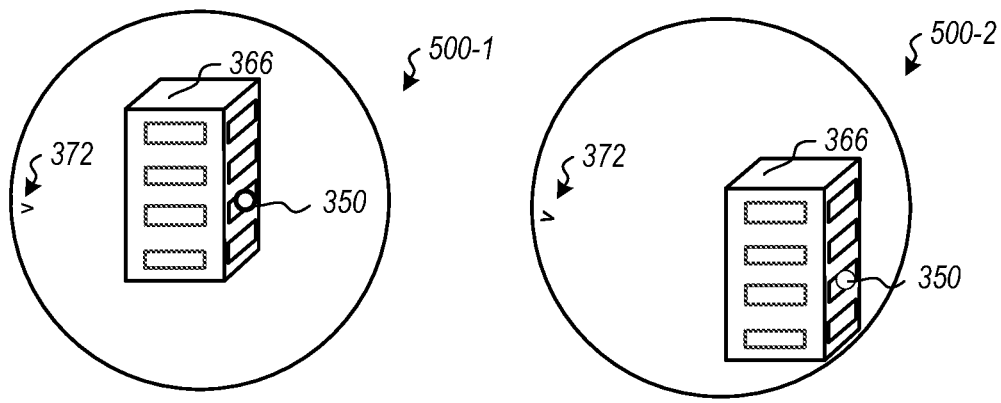
FIGS. 5A, 5B, and 5C illustrate various images displaying indicators corresponding to specific instances of light.
Figure 5B:
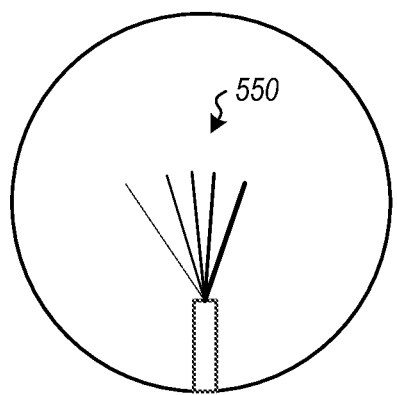
Figure 5C:
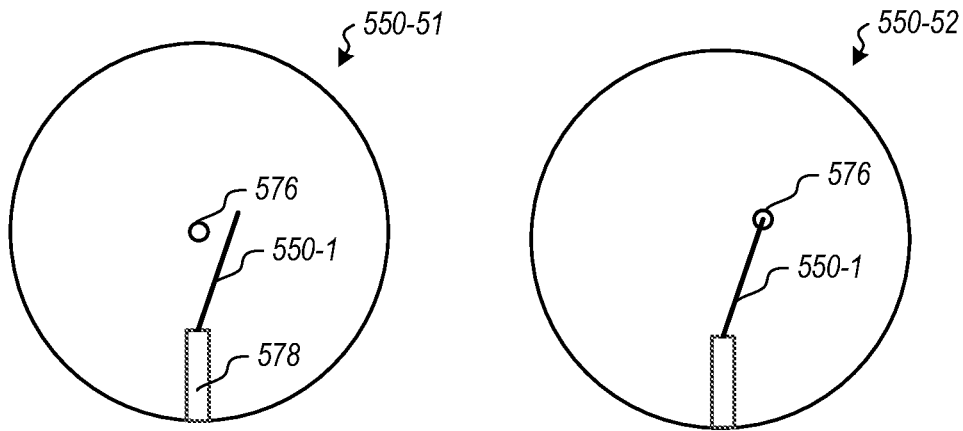

In the example illustrated in FIG. 3, the transparent optical device 318 outputs display light 326 which can be sent to the eyepiece (such as the eyepiece 122 illustrated in FIG. 1). As noted previously, the output light 328, which in this case is intensified light, is transmitted through the transparent optical device 318 is also provided to the eyepiece. Thus, an image such as that illustrated in FIG. 2 or in FIGS. 5A-5C are presented to the user in the nightvision system.

Figure 7:
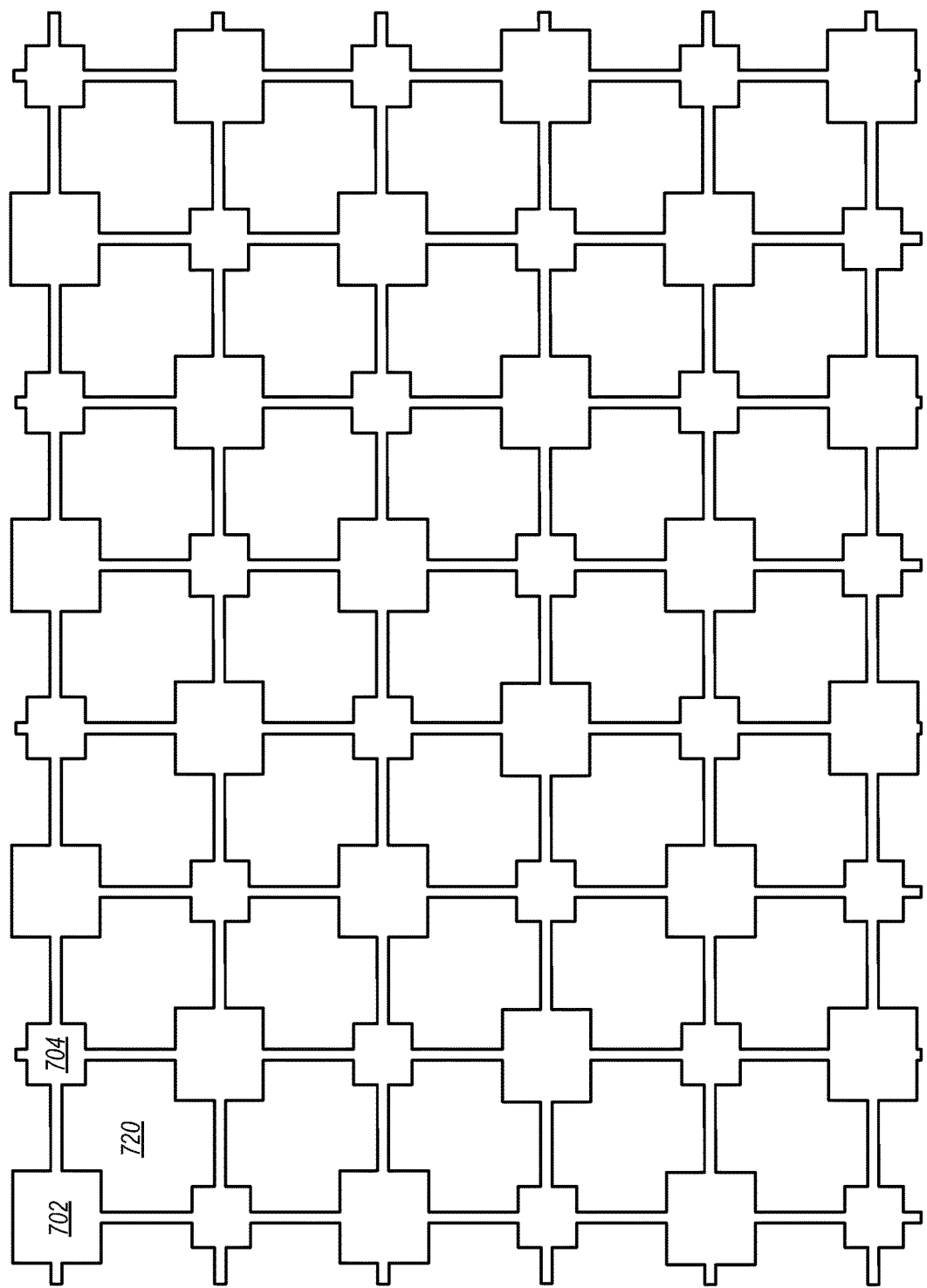
FIG. 7 illustrates a particular layout for a transparent optical device.
Figure 8:
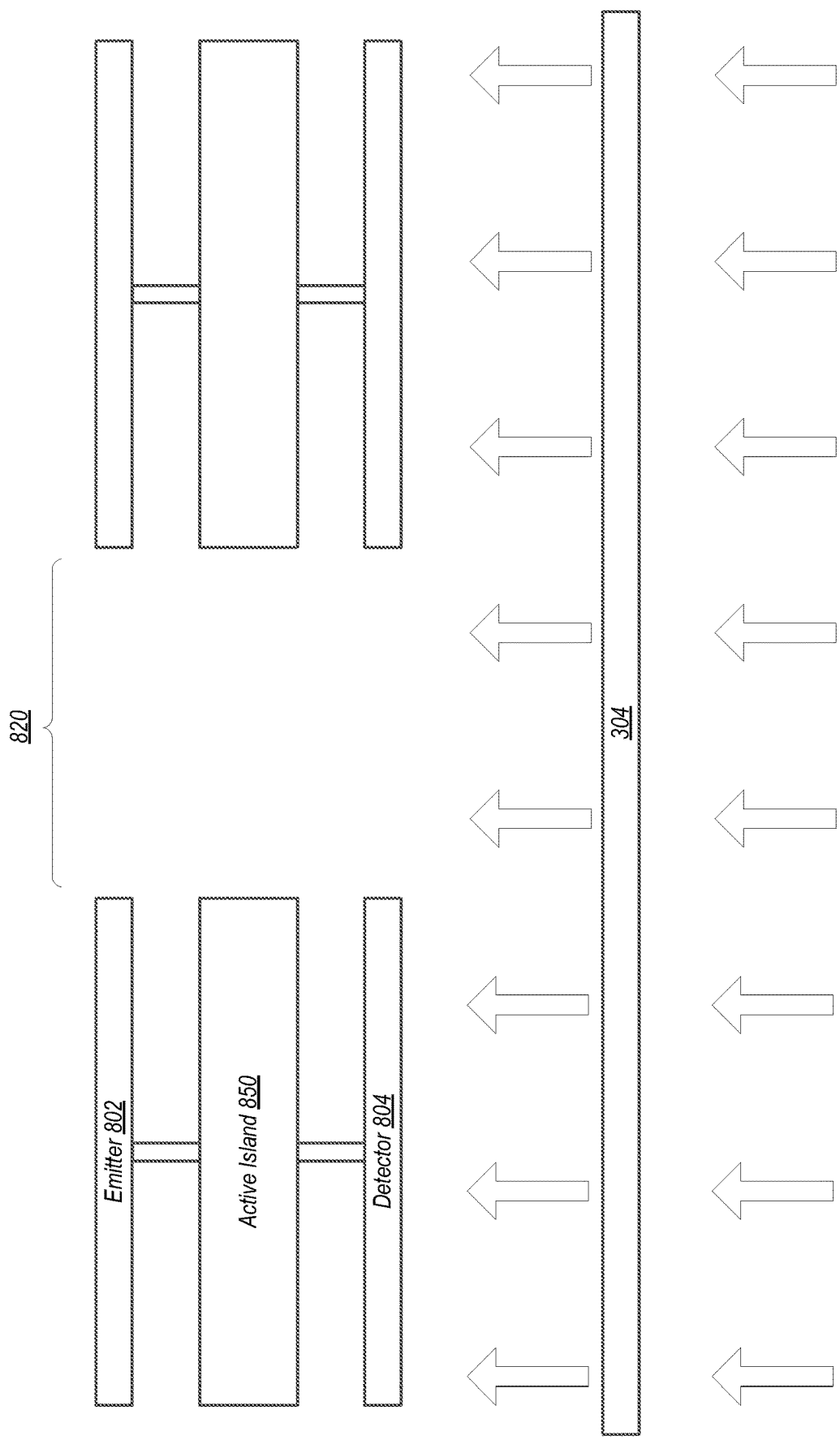
FIG. 8 illustrates an alternate layout for a transparent optical device.

The transparent optical device also includes a transparent photodetector 319, which includes a plurality of detectors for detecting light from the underlying device 304. While shown separately in FIG. 3, the transparent display 320 and transparent photodetector 319 are often implemented on the same semiconductor chip. For example, detector elements could be interdigitated with display elements. An example of this is illustrated in FIG. 7, where display elements (represented by example display element 702) are interdigitated laterally with detector elements (represented by the example detector element 704), with transparent regions (represented by the transparent regions 720). An alternative example is illustrated in FIG. 5, where detector elements, such as detector element 804 is implemented below an active silicon island 850, which is implemented below a display element 802. Note that 'below' used here is relative to the arrangement shown in FIG. 8. In practice, the detectors 804 are in an optical path of incoming light such that the detectors block (at least partially) light from being transmitted to the active silicon island 850 and display element 802.

As noted previously, the transparent optical device 318 is composed of a number of active silicon areas. In particular, the transparent optical device 318 is a digital display having a certain pixel density. Each pixel has one or more transistors controlling one or more OLED emitters. In some embodiments illustrated herein, as shown above, the pixels may further include light detectors. This can be useful for detecting the intensified light from the phosphor screen 312. This detected light can be used to characterize the image intensifier image, which can in turn be used to determine how light 326 is output from the transparent optical device 318.

In some embodiments, the detected light can additionally be used for recording scene events and/or improving placement of elements displayed on the heads-up display. In any case, the transparent optical device 318 is representative of a stacked transparent optical device formed in a semiconductor chip that overlaps an underlying device, in this case, the underlying device is an image intensifier. The transparent optical device is transparent to light in a first spectrum, which in this case is the visible spectrum of light output by the phosphor screen 312. That is, the transparent optical device 318 is not fully transparent due to the blocking of the active devices, but transparency referred to herein refers to at least partial transparency according to some transmission efficiency. Indeed, the more active devices implemented per pixel, the less transparent the transparent optical device 318 becomes. Thus, some embodiments are specifically implemented in a fashion designed to limit the number of active devices per pixel, such as by including only a single detector per pixel. However, other embodiments may be implemented with multiple detectors per pixel.

Figure 6:
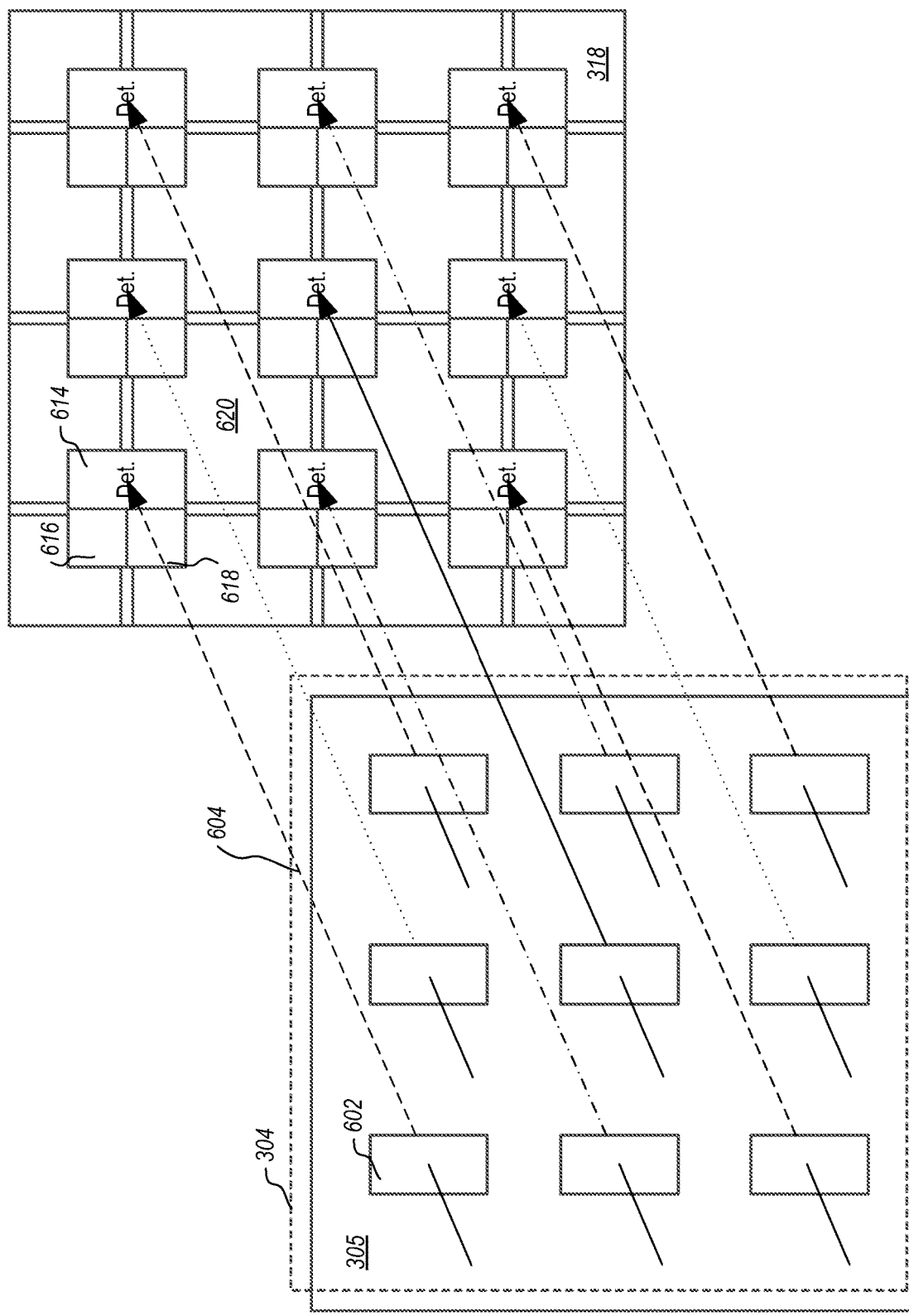
FIG. 6 illustrates an optical system including various color filters.

Each detector absorbs a portion of the intensified light converting it to an electrical signal. For example, embodiments can implement a two-dimensional array of detectors that generate charges, current, or any other form of digital data level proportional to intensity of the intensified light as a function of position. An example of this is illustrated in FIG. 6 by the detectors shown there, of which detector 604 is representative. Accordingly, the detectors may generate a two-dimensional array of electrical charge that represents at least portions of the intensified image. This two-dimensional array of electrical charges can be periodically read from the detectors (e.g., the detected signal can be read from the detectors like in a charged coupled device (CCD) camera).

The two-dimensional array of electrical charges from the photodetector 319 is processed and/or used locally, e.g., within the transparent optical device 318 to modulate in real time the amplitude of the display light 326 output by the transparent optical device 318. In particular, the transparent optical device 318 will output light based on the light detected by the detectors along with other information.

As noted previously, the transparent optical device 318 includes regions that are transparent to intensified light output by the underlying device 304. For example, FIG. 7 illustrates a number of transparent regions, of which transparent region 720 is representative.

Figure 4:
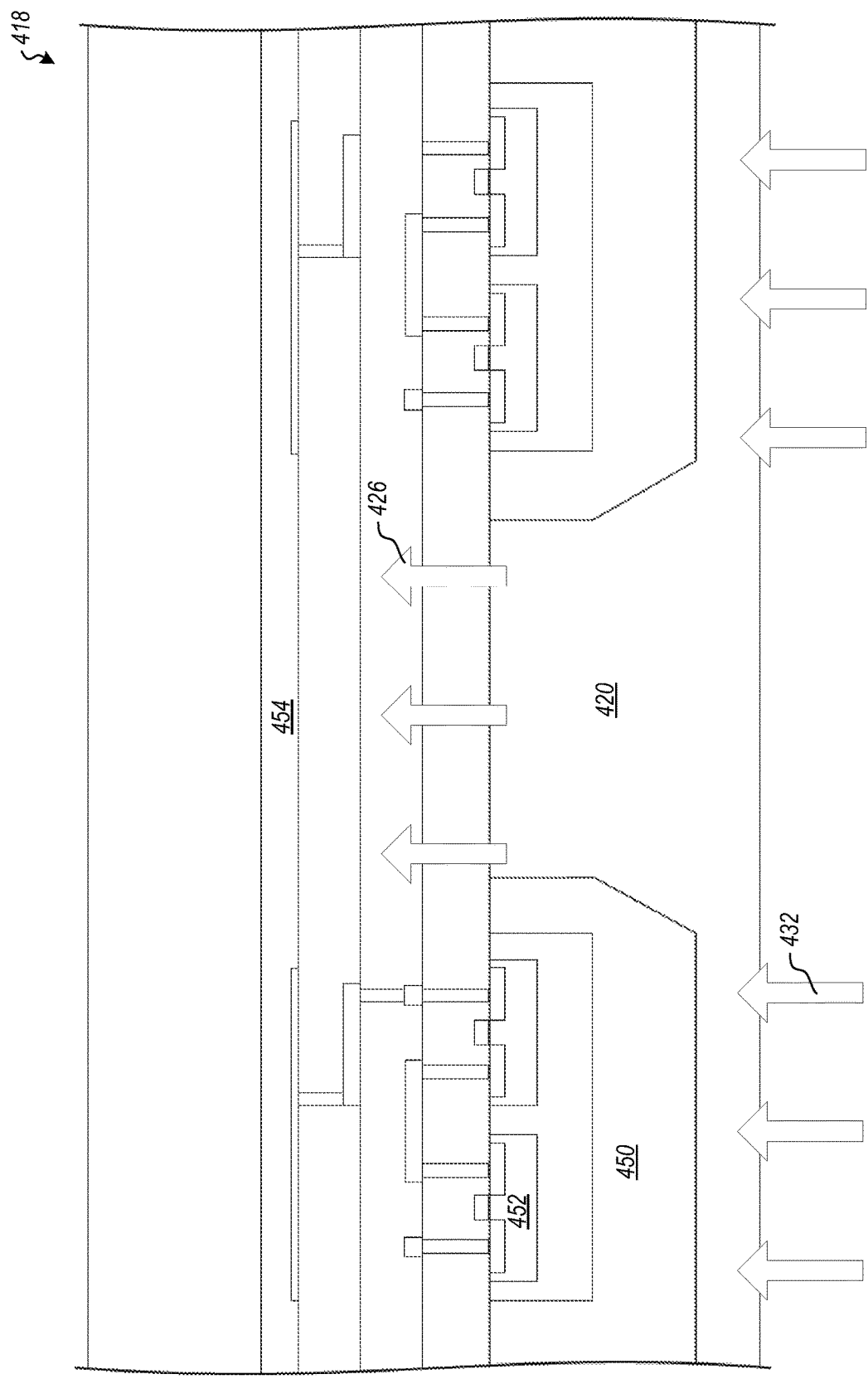
FIG. 4 illustrates a transparent display structure cross-section view, including transparent regions.

The transparent regions shown in the preceding figures can be created in a number of particular ways. In some embodiments, the transparent regions can be created by using the processes described in U.S. patent application Ser. No. 16/686,306 titled "Backside Etch Process For Transparent Silicon Oxide Technology", which is incorporated herein by reference in its entirety. Briefly, that application describes a process for creating transparent regions in otherwise opaque portions of semiconductor materials. For example, reference is now made to FIG. 4 which illustrates a transparent optical device 418 including active silicon areas shown as active silicon islands (which may be native silicon islands) such as active silicon island 450. In particular, active silicon islands include transistors such as transistor 452 which control OLED emitters in an OLED stack 454. Note, that as discussed above, transistors also control detectors, such as various photodiodes or other detectors. In the example illustrated in FIG. 4, each of the active silicon islands represents a pixel or sub-pixel of the transparent optical device 418. Thus, by illuminating various LEDs in the OLED stack 454 using the transistors in the active silicon islands, an image can be created and output to a user, such as by outputting display light such as the display lights 326 illustrated in FIG. 3.

As illustrated in FIG. 3, intensified light is transmitted through the transparent optical device 318 to the eyepiece of the nightvision system, and then to the user. Note, however, that the intensified light is transmitted to the user through the transparent optical device 318, meaning that the intensified light will be affected by characteristics of the transparent optical device 318.

Referring once again to FIG. 4, light 426 represents light that is transmitted through transparent portions, illustrated by the transparent region 420, of the transparent optical device 418, while light 432 is blocked by active portions of the transparent optical device 418.

However, transmission of light through the transparent optical device is nonetheless increased by removing portions of silicon that are not needed for implementing active electrical components or for supporting metal traces. For example, consider an example where dynamic pixel cells are used. In this particular example, there are two sub pixels per pixel. Anode size for the sub pixels is 8 μm×5.1 μm. Pixel area is 10.1 μm×12.4 μm. Pixel pitch is 22.5 μm×22.5 μm. In one example, provides a resolution of 800x800. In this particular transparent optical device, if the non-active silicon islands are not removed, transparency of the transparent optical device is about 33%. In contrast, transparency is about 61% if the non-active silicon islands are removed such as in the structure illustrated in FIG. 4. Thus, in this example, transparency of a transparent optical device is increased by more than 80% by removing silicon and/or oxide trenches.

Note that various engineering trade-offs can be made to meet certain requirements. For example, increased transparency can be obtained by having a lower resolution and/or using fewer sub pixels as there is more space between pixels and/or sub pixels. If a higher resolution is needed, then that transparent optical device will have a lower transparency than an equivalently sized transparent optical device with a lower resolution. Thus, for example, a transparent optical device with a 36 μm pitch can obtain a transparency of 81%, while a transparent optical device of 22.5 μm pitch can obtain a transparency of 67%, while a transparent optical device having a 17.5 μm pitch will be about 55% transparency when non-active silicon islands are removed from the transparent optical device in each of the illustrated examples. Thus, some embodiments may be able to create a transparent optical device with at least a 36 μm pitch with at least a transparency of 75%, or a transparent optical device of at least a 22.5 μm pitch with at least a transparency of 60%, or a transparent optical device having at least a 17.5 μm pitch with at least a 50% transparency when silicon is removed between active silicon areas. The preceding illustrates one specific example related to a particular manufacturing process.

Pitch and transparency values may be specific to a given semiconductor manufacturing process—also known as the technology or process node—and will of course vary as the node changes. Typically designating the process's minimum feature size, the technology node will dictate the area of required active silicon for the display CMOS based on the transistor size. As the node minimum feature size decreases, whether it be through alternate foundries or improvements in technology, the same need for maximizing transparency applies. Indeed, the benefit to removing non-active silicon islands improves as the ratio of inactive- to active-silicon increases with smaller transistors.

The example numbers described herein are derived assuming a 180 nm technology/process node, although similar calculations can be performed for any specific technology size.

Returning once again to FIG. 3, a particular example is further illustrated. FIG. 3 illustrates that the optical system 300 includes the underlying device 304. As discussed above, the underlying device 304 is configured to provide output light 328 in a first spectrum from input light 302 received at the underlying device 304.

The optical system includes a transparent optical device 318 optically coupled in an overlapping fashion to the underlying device 304. The transparent optical device 318 is configured to transmit light in the first spectrum from the underlying device 304 through the transparent optical device 318 to display a scene to a user.

The transparent optical device 318 includes a set of detector active elements formed in an active area of the transparent optical device 318 configured to cause the transparent optical device 318 to detect light portraying at least a portion of the scene. Thus, for example, the photodetector 319 includes detector elements that detect the scene from light output by the underlying device 304 and provides detected scene information 364 to an image processor 368.

The transparent optical device 318 further includes a set of transparent regions formed in the active area which are transparent to the light in the first spectrum to allow light in the first spectrum to pass through from the underlying device 304 to a user 354. Examples of such transparent regions are illustrated at 420, 720, and 820 of FIGS. 4, 7, and 8 respectively.

The optical system 300 includes the image processor 368. The image processor 368 is configured to process images produced using light detected by the detector active elements to identify a specific instance of light in the scene. In the example illustrated in FIG. 3, the specific instance of light 352 is a gunshot from a window of a building 366.

The image processor 368 is configured to cause display elements in the display 320 in the active area of the transparent optical device 318 to display an indicator, in the scene, to the user, correlated to the specific instance of light, including during a change in the scene. In particular, the indicator 350 is correlated to the specific instance of light 352. The image processor 368 is able to correlate the indicator in output to the transparent display 320 with objects, orientations, and/or locations in the scene. An example of this is illustrated in FIG. 5A. FIG. 5A illustrates an image 500-1 at a first time in a heads-up display and an image 500-2 at a second time in the heads-up display. In these images, the building 366 is displayed as a result of the output light 328 from the underlying device 304. In contrast, the indicator 350 is displayed as a result of the transparent display 320 outputting the display light 326 as a result of the image processor 368 indicating where the indicator 350 should be displayed in the displayed scene. Note that in FIG. 5A, even though the scene changes from image 500-1 to 500-2, the indicator 350 is displayed in the same location with respect to the building 366. Thus, the image processor 368 is configured to correlate the indicator 350 to specific locations in a scene. Alternatively, the image processor 368 may be configured to correlate the indicator 350 to specific objects in a scene.

Note that while in this particular example, the scene changes due to user movement, in other examples, the scene may change due to movement of objects in the scene. For example, consider the case where the specific instance of light is from the window of a moving bus. Some embodiments may be configured to persist the indicator on that particular window as the bus moves in the scene.

The image processor can correlate the indicator to specific locations in the scene using a number of different methodologies. For example, in one embodiment, the optical system 300 includes an orientation determination device 370 coupled to the image processor 368. The orientation determination device 370 can determine a particular orientation of the optical system 300 at various points and provide that information to the image processor 368. For example, the orientation of the system 300 can be provided when the specific instance of light 352 is detected, as well as at subsequent times. Knowing the orientation of the device 300 allows the image processor 368 to cause the display active elements in the transparent optical device 318 to display the indicator 350, in the scene, to the user 354, correlated to the specific instance of light by using the orientation determination device 368. Note that the orientation may include a number of different factors including position and various angles often referred to as pitch, roll, and heading. In some embodiments, to accomplish this, the orientation determination device 370 may be an inertial measurement unit (IMU) that includes elements such as accelerometers, gyroscopes, GPSs, etc.

In an alternative embodiment, the image processor 368 is configured to detect objects in the scene using the detector active elements. For example, the detected scene information 364 may be used along with edge detection algorithms to identify specific objects, such as the building 364, in the scene. Similar edge detection may be performed over time to determine device 300 position and orientation by comparing scene information at various times. In such embodiments, the image processor 368 is configured to cause display active elements in the transparent display 320 of the transparent optical device 318 to display an indicator 350, in the scene correlated to the specific instance of light by using information about detected objects in the scene.

Note that in addition to the indicator 350, other indicators may be displayed. For example, the indicator 372 (see FIG. 5A) may be displayed as a pointer to the indicator 350. The indicator 372 is in a static location in the image provided to the user 354, whereas the indicator 350 can change locations as the scene changes. In this way, the user 354 knows a specific location where they can look (i.e., the static location of the indicator 372) to attempt to locate the indicator 350. Note that the indicator 370 can be displayed when the indicator 350 is not displayed if the device 300 has sufficient information to direct the user to change the scene to bring objects, location, or orientations corresponding to the indicator 350 into view. In an alternative embodiment, if the indicator 350 is not displayed, the indicator 372 will not be displayed either.

Note further that some embodiments can display multiple indicators analogous to indicator 350 at the same time. This may be due to multiple gunshots or for other reasons. In such embodiments, the indicator 372 may have certain ordering rules to determine which indicator it will point at. For example, rules may be time based, such as in one example where the indicator 372 points to the most recently instantiated indicator. Alternatively, the rules may be brightness based, such as in one example where the indicator 372 points to the indicator corresponding to a brightest detected light. Alternatively, the rules may be distance based, such as in one example where the indicator 372 points to the indicator corresponding to a closest object or location.

The optical system 300 may be implemented where the image processor 368 is configured to cause to the indicator to decay over time. For example, FIG. 5A illustrates the indicator 350 in the first image 500-1 with a certain line thickness, whereas the line thickness of the indicator 350 in the second image 500-2 is thinner due to the indicator 350 decaying over time. Embodiments may show decay by reducing brightness, changing color, changing line thickness, or in other ways, or combinations thereof.

FIG. 5B illustrates another example with multiple indicators each in different stages of decay. In this example, the indicators 550 are created as a result of detecting and tracking gunshots being fired by the user 364.

For example, in one embodiment, the specific instance of light in the scene comprises laser light being reflected off of the back of a bullet. For example, FIG. 3 illustrates a laser 374. The laser 374 is positioned such that it can reflect off of bullets fired by the user 354. For example, the laser 374 may be mounted to a rifle. Note that in some embodiments, the system 300 may be mounted to a rifle as part of a rifle scope system. In any case, the laser 374 is configured to reflect off of flat back bullets to create specific instances of light that can be detected by the photodetector 319 for use in displaying indicators such as the indicators 550. In this way, a warfighter can cause every bullet to appear to the warfighter as a tracer round, without needing to fire actual tracer rounds.

Note however, that in other embodiments, the specific instance of light in the scene comprises tracer combustion associated with a bullet. That is, the photodetector 319 may be configured to detect tracer round combustion.

Some embodiments may be configured where the image processor is configured to cause a reticle to be updated to be correlated to the indicator. This 'disturbed reticle' embodiment can allow a system being used as a rifle scope to self-sight. For example, consider the example illustrated in FIG. 5C. FIG. 5C illustrates a first image 500-51 and a second image 500-52. The first image 500-51 shows a reticle 576 displayed by the transparent display 320, an indicator 550-1 displayed by the transparent display 320 as a result of the transparent detector detecting a fired bullet, and a rifle barrel 578 displayed by the underlying device 304 transmitting intensified light 328 through the transparent optical device 318. Embodiments may further include a laser range finder for determining distances of targets. Using various user setting selecting a sighting distance and the displayed indicator 550-1, the image processor 368 can determine that the reticle 576 should be moved as illustrated in the second image 550-52. In this way, the device 300 will be sighted in for the desired distance.

In some embodiments, the system 300 may include one or more filters configured to filter a portion of light input into the optical system. In some such embodiments, one or more of the detector active elements corresponds to the filter, such that the indicator is displayed dependent on detecting preselected wavelengths of light. For example, attention is directed to FIG. 6. FIG. 6 illustrates a fiber optic 305 which includes a plurality of filters, of which filter 602 is representative. Filter 602 is configured to filter for certain wavelengths of light. For example, filter 602 may be configured to pass only certain wavelengths of short wavelength infrared (SWIR), long wavelength infrared (LWIR), or other infrared light. In some embodiments, the underlying device 304 is also able to detect such light and emit output light based on detecting such light. However, if light is detected by a detector corresponding to the filter 602 (i.e., detector 614), then the system 300 can determine that the specific wavelength of light is present in a particular location corresponding to the filter 602 and detector 614. This could be used, for example, when using IR lasers to reflect off of bullets to prevent the lasers from being seen by enemy forces. Alternatively, tracer combustion materials may be selected to emit certain wavelengths of IR light, while excluding emissions of visible light, which could be detected by the system 300 to display the indicator 350. Again, this could prevent enemy forces from seeing the tracer rounds.

Further, if certain detectors are unfiltered or are filtered for visible wavelengths, then embodiments could distinguish between friendly fire rounds and enemy rounds.

In some embodiments, optical system 300 may be implemented where the specific instance of light in the scene comprises light from a beacon. This could be done in either filtered embodiments or unfiltered embodiments. The beacon could include a pulsed code to identify individuals transmitting the beacon. In such case, the indicator could be used to identify specific individuals or other entities.

In some embodiments, optical system 300 may be implemented where the detector active elements and the display active elements are implemented in a single semiconductor chip. Alternatively, the display elements may be implemented in one transparent chip, while the detector elements are implemented in a different transparent chip. In some such embodiments, transparent regions may be aligned to optimize transparency.

In some embodiments, optical system 300 may be implemented where the detector elements are configured to cause the transparent optical device 318 to detect light from the underlying device. Examples of this are illustrated in FIG. 3, where the photodetector 319 is after the underlying device 304. However, other embodiments may be implemented where the photodetector 319 is placed before the underlying device 304. This may be less preferred in some embodiments as it reduces input light to the underlying device, inasmuch as the photodetector 319 is only partially transparent. However, this arrangement may provide for better color detection or other advantages.

Further, the embodiments may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical system comprising:
   an underlying device, the underlying device configured to provide output light in a first spectrum from input light received at the underlying device;
   a transparent optical device optically coupled in an overlapping fashion to the underlying device, wherein the transparent optical device is configured to transmit light in the first spectrum from the underlying device through the transparent optical device to display a scene to a user, the transparent optical device comprising:

a first plurality of active elements formed in an active area of the transparent optical device configured to cause the transparent optical device to detect light portraying at least a portion of the scene; and a first plurality of transparent regions formed in the active area which are transparent to the light in the first spectrum to allow light in the first spectrum to pass through from the underlying device to a user; and the optical system further comprising an image processor configured to:

process images produced using light detected by the first plurality of active elements to identify a specific instance of light in the scene; and cause a second plurality of active elements in the active area of the transparent optical device to display an indicator, in the scene, to the user, correlated to the specific instance of light, including during a change in the scene.

2. The optical system of claim 1, wherein the first plurality of active elements and second plurality of active elements are implemented in a single semiconductor chip.

3. The optical system of claim 1, wherein the first plurality of active elements is configured to cause the transparent optical device to detect light from the underlying device.

4. The optical system of claim 1, further comprising an orientation determination device and wherein the image processor is configured to cause the second plurality of active elements in the transparent optical device to display an indicator, in the scene, to the user, correlated to the specific instance of light, including during a change in the scene by using the orientation determination device.

5. The optical system of claim 1, wherein the image processor is configured to detect objects in the scene using the first plurality of active elements and wherein the image processor is configured to cause the second plurality of active elements in the transparent optical device to display an indicator, in the scene, to the user, correlated to the specific instance of light, including during a change in the scene by using information about detected objects in the scene.

6. The optical system of claim 1, wherein the image processor is configured to cause the indicator to decay over time.

7. The optical system of claim 1, wherein the image processor is configured to cause a reticle to be updated to be correlated to the indicator.

8. The optical system of claim 1, further comprising a filter configured to filter a portion of light input into the optical system and where one or more of the active elements in the first plurality of active elements corresponds to the filter, such that the indicator is displayed dependent on detecting preselected wavelengths of light.

9. The optical system of claim 1, wherein the specific instance of light in the scene comprises laser light being reflected off of the back of a bullet.

10. The optical system of claim 1, wherein the specific instance of light in the scene comprises tracer combustion of a bullet.

11. The optical system of claim 10, wherein the tracer combustion is selected to emit IR light, while excluding visible light emissions.

12. The optical system of claim 1, wherein the specific instance of light in the scene comprises light from a beacon.

13. A method of displaying an indicator in an optical system, the method comprising:

at an underlying device, providing output light in a first spectrum from input light received at the underlying device;

at a transparent optical device optically coupled in an overlapping fashion to the underlying device, transmitting light in the first spectrum from the underlying device through the transparent optical device to display a scene to a user by transmitting light in the first spectrum through a first plurality of transparent regions formed in an active area of the transparent optical device which are transparent to the light in the first spectrum;

at the transparent optical device, detecting light portraying at least a portion of the scene using a first plurality of active elements formed in the active area of the transparent optical device;

at an image processor, processing images produced using light detected by the first plurality of active elements to identify a specific instance of light in the scene; and at the image processor causing a second plurality of active elements in the active area of the transparent optical device to display an indicator, in the scene, to the user, correlated to the specific instance of light, including during a change in the scene.

14. The method of claim 13, further comprising, at an orientation determination device determining an orientation of the optical system and wherein causing the second plurality of active elements in the transparent optical device to display an indicator, in the scene, to the user, correlated to the specific instance of light, is performed by using the determined orientation.

15. The method of claim 13, further comprising, at the image processor, detecting objects in the scene using the first plurality of active elements and wherein the image processor is configured to cause the second plurality of active elements in the transparent optical device to display an indicator, in the scene, to the user, correlated to the specific instance of light, including during a change in the scene by using information about detected objects in the scene.

16. The method of claim 13, further comprising at the image processor, causing the indicator to decay over time.

17. The method of claim 13, further comprising at the image processor, causing a reticle to be updated to be correlated to the indicator.

18. The method of claim 13, further comprising, at a filter, filtering a portion of light input into the optical system and where one or more of the active elements in the first plurality of active elements corresponds to the filter, such that the indicator is displayed dependent on detecting preselected wavelengths of light.

19. The method of claim 13, comprising detecting the specific instance of light in the scene by detecting laser light being reflected off of the back of a bullet.

20. The method of claim 13, comprising detecting the specific instance of light in the scene by detecting light from a beacon.

* * * * *